April 11, 1939.   D. D. GOLDBERG ET AL   2,153,885
VALVE APPARATUS
Filed July 6, 1935    4 Sheets-Sheet 3
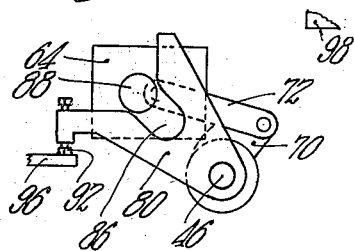
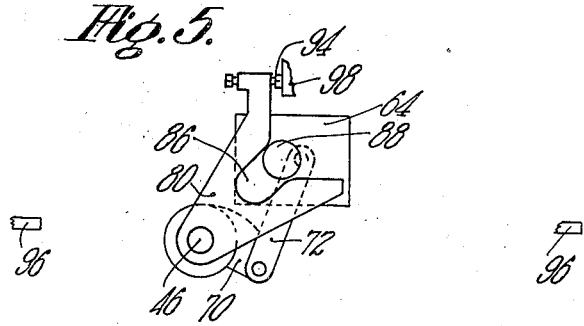
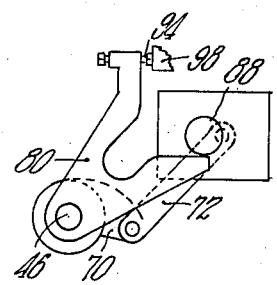

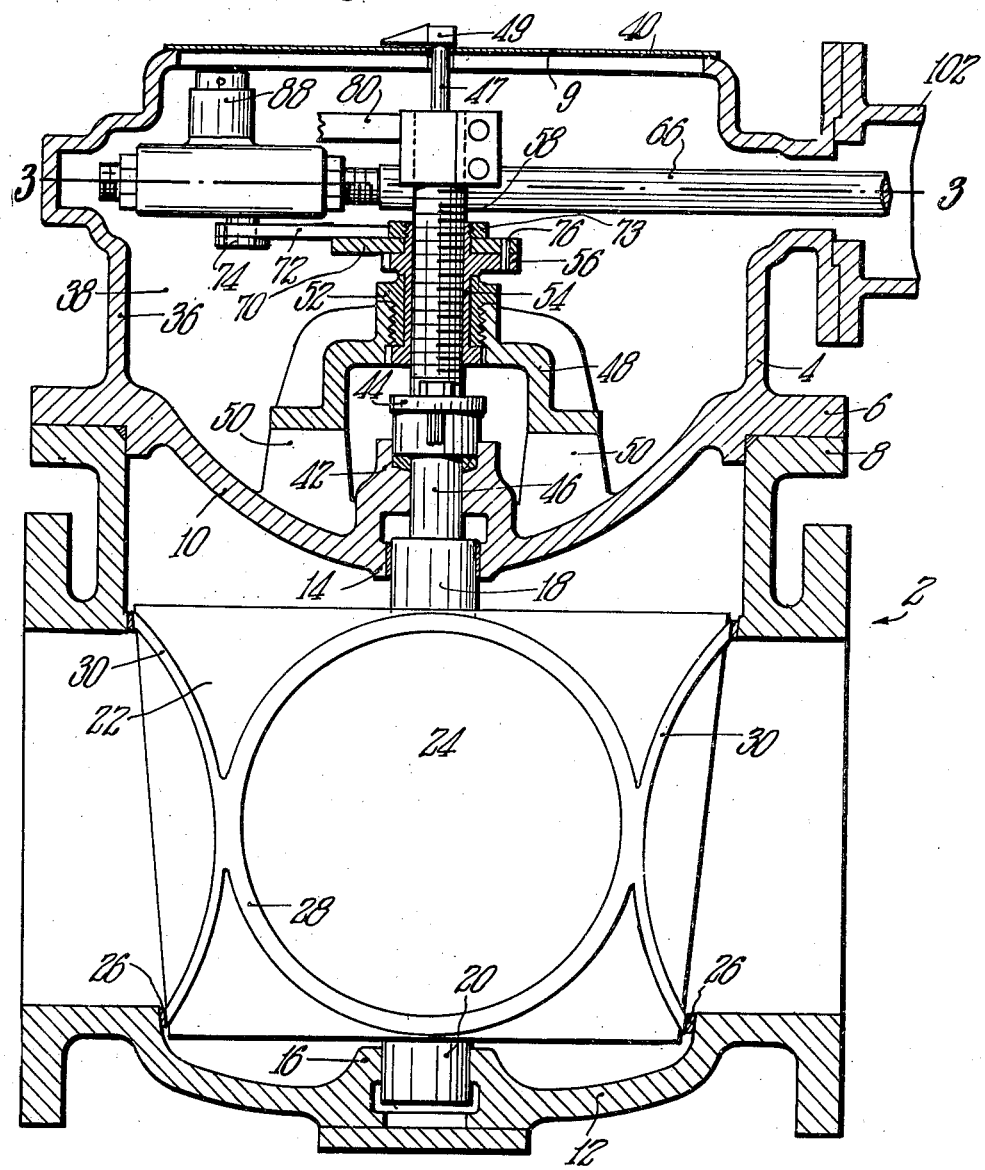

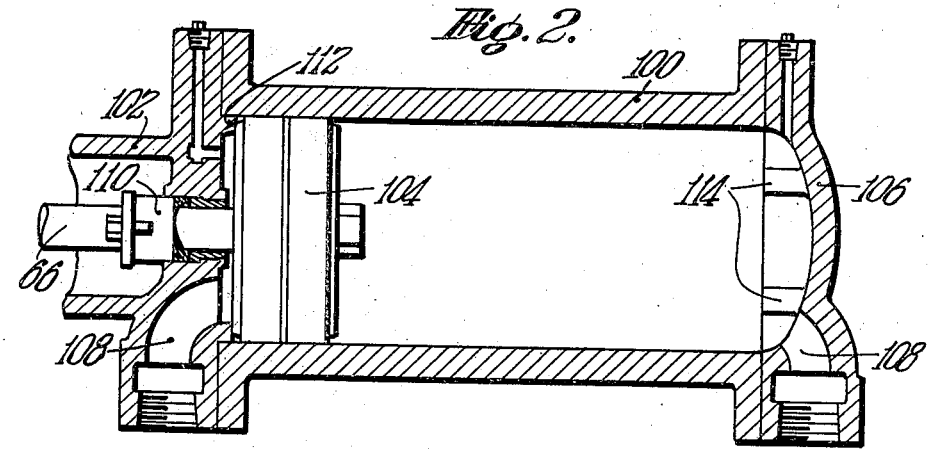
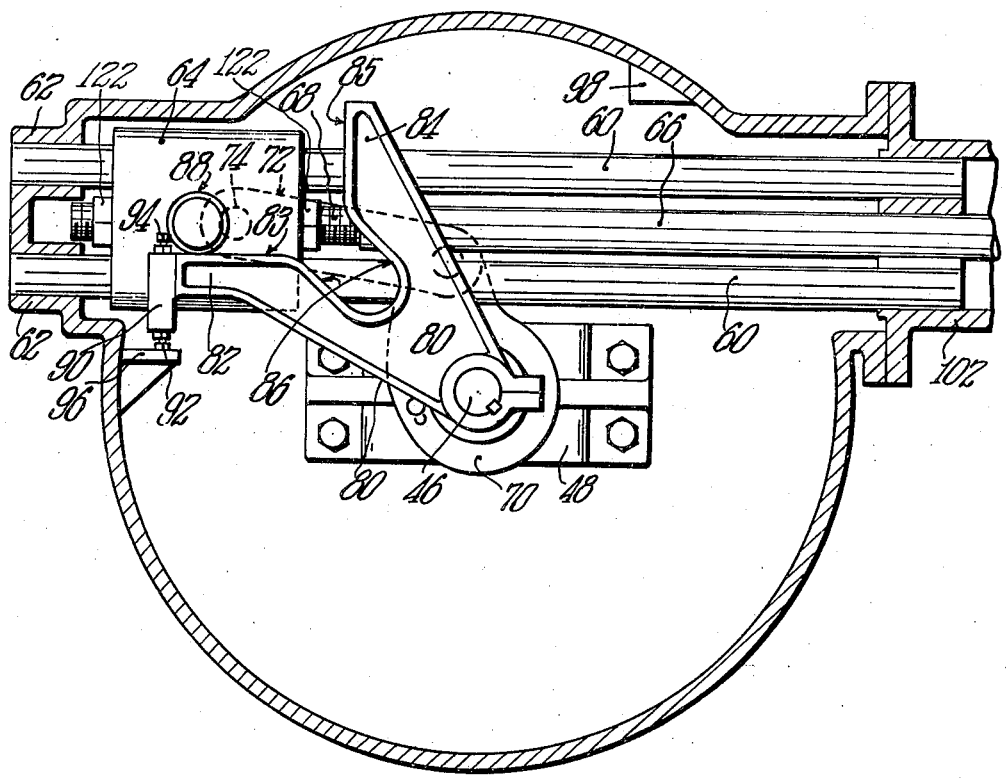

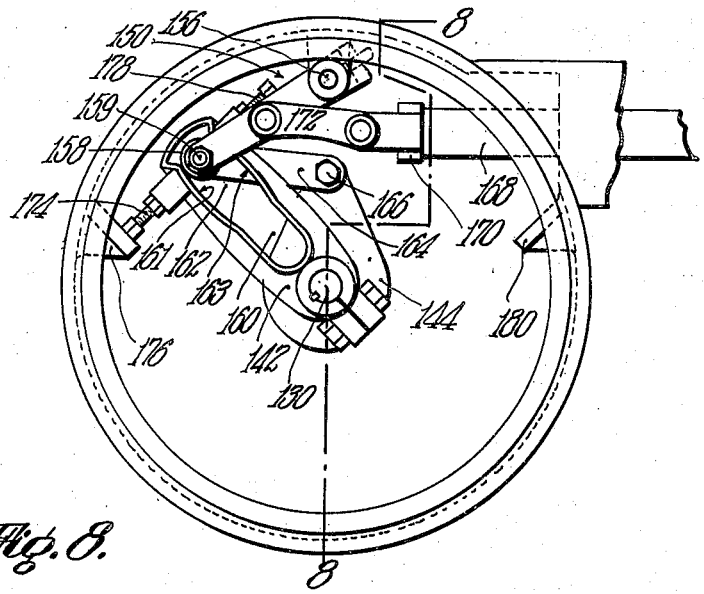
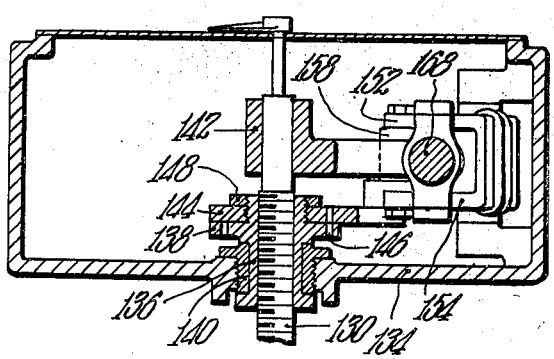
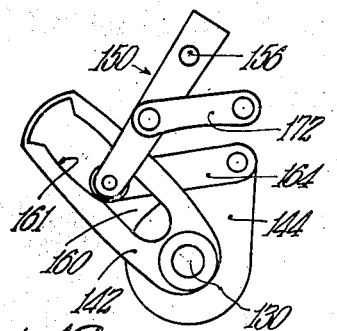
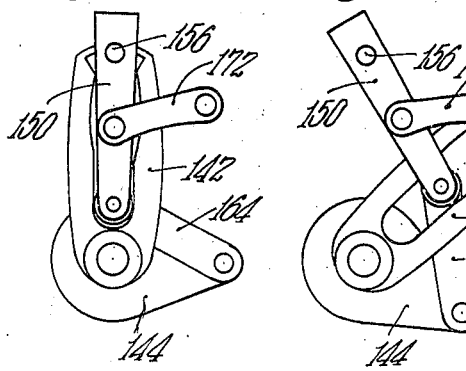
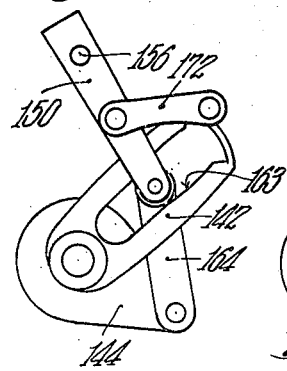
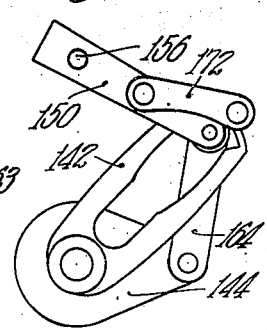

Patented Apr. 11, 1939

2,153,885

UNITED STATES PATENT OFFICE 2,153,885

VALVE APPARATUS

David D. Goldberg, Springfield, and Aaron R. Kligman, Indian Orchard, Mass., assignors, by direct and mesne assignments, to Chapman Valve Manufacturing Company, Indian Orchard, Mass., a corporation of Massachusetts Application July 6, 1935, Serial No. 30,055

8 Claims. (Cl. 251—97)

This invention relates to improvements in valve apparatus and is directed more particularly to improvements in a valve structure having a plug adapted to function in a novel manner and operating means therefor.

One object of the invention is the provision of a valve apparatus in which a conical plug member is reciprocable between the wedged and unwedged position and is rotatable between open and closed positions, all to the end that the said plug may be wedged in the body in either an open or closed position. The wedging of the plug provides a tight, metal-to-metal contact of the plug and body to seal the plug in the body and thereby prevent fluid passing therearound so that the valve in the fully open position affords a continuous pipelike fluidway, confining the flow within this pipelike fluidway and eliminating the possibility of the fluid in motion surrounding the plug which often causes sticking of the plug, corrosion of the parts and other injurious effects.

As one special feature of the improved structure, the plug is pivoted or journalled in the body at its upper and lower ends by means of pivots which are relatively small in diameter in comparison to the diameter of the plug. Not only do the relatively small diameters facilitate free movement of the plug with a minimum of friction and operating effort, but the plug is accurately guided in its reciprocating and rotating movements obviating any dragging tendency of the plug in the body such as would be brought about by unbalanced pressures at opposite sides of the plug, which tend to move the plug from its true axis of movement. As a result, the coacting seating parts of the plug and body are protected against injury and in the fully open or fully closed position of the plug, there exists a tightly sealed relation between the plug and body.

Another feature of the invention is the provision of means for reciprocating the plug between wedged and unwedged positions and for rotating the plug in its unwedged position. The means is not only characterized by its novelty, simplicity and efficiency, but is arranged to releasably lock the plug in a wedged position.

Still another feature of the invention is the provision of means for enclosing the operating mechanism whereby the said mechanism is adequately protected and at the same time readily accessible for removal, repair or maintenance purposes without the necessity of disturbing the plug and associated parts.

Another feature of the invention is the easily accessible adjustments for aligning the plug in the proper position for wedging in both its fully open or fully closed position.

Another feature of the invention is the provision for easily adjusting the amount of wedging given to the plug in both the open and closed position.

Various other novel features and advantages of the invention will be fully described and referred to in connection with the accompanying description of the preferred form of the invention, reference being made to the accompanying drawings, wherein:

Fig. 1 is a sectional elevation through a valve apparatus embodying the novel features of the invention;

Fig. 2 is a sectional elevational view through a cylinder showing a piston for actuating the operating mechanism shown in Figs. 1 and 3;

Fig. 3 is a sectional plan view on the line 3—3 of Fig. 1 at a slightly larger scale;

Figs. 4, 5 and 6 are diagrammatic plan views showing the plug operating mechanism of the invention in various positions;

Fig. 7 is a plan view showing a modified form of the operating mechanism;

Fig. 8 is a sectional elevational view on the line 8—8 of Fig. 7; and

Figs. 9, 10, 11 and 12 are diagrammatic plan views showing the operating mechanism of Figs. 7 and 8 in various positions.

Referring now to the drawings, the invention will be described more in detail.

A valve body is represented at 2 and it has ports as shown at its opposite sides. This body 2 may take any of the usual forms so as to be adapted for connection to a pipe line and it has a cover 4 at its upper end. A cover flange 6 is provided, which may be secured as by bolts (not shown) to a body flange 8.

The body 2 has a bore which is conical in shape for receiving a plug 22 which is also conical. The cover, when bolted to the body, forms a fluid-tight compartment. In the cover 4 and in the body 2, machined centrally on the axis of the conical plug bore, are bearings, one 16 in the lower end of the body, the other 14 in the cover. Mounted in these bearings are pivots 18 and 20 associated with the plug 22 which are cylindrical in shape and capable of both an axial motion and a rotary motion. The plug 22 which is conical in shape can be wedged or seated in the conically-shaped bore of the body by an axial motion downward and can be unwedged by means of an axial motion upward. The plug 22 can be easily rotated when unwedged as it is mounted on the pivots 18 and 20 which co-act with their respective bearings.

The plug in Fig. 1 is shown in the closed position. In order to move the plug 22 so it aligns with the ports in the body 2, the plug 22 is first given an axial motion upward which unwedges it and retracts sealing seats 30 on the plug from the sealing seats 26 in the body.

The plug is restrained to rotative and axial movements due to the pivots 18 and 20 in bearings 14 and 16. The result is a uniform clearance at all points between the seats on the plug and the seats in the body. The plug when unwedged may then be rotated until port 24 thereof aligns with the ports or openings in body 2 and subsequently, the plug is given an axial motion downward so that the seats around the waterway 24 in the plug align and wedge with the seats around the waterway in the body. The reverse of said action takes place in closing the valve.

The sequence of the movements of the plug just described are given to the plug by means of an operating mechanism disposed above and acting on the plug in a chamber 38 in the cover. Attached to the upper end of the plug above pivot 18 is a stem 46 and near the extreme upper end of this stem 46 is a rotator lever or arm 80.

The plug 22 with its pivots 18 and 20, together with the stem 46 and rotator lever 80, form a rigid unit so that whatever motion is given to rotator lever or stem is also given to the plug. Stem 46 extends through a stuffing-box represented by 42 and 44. The stem 46 is the means of connecting the operating mechanism in the chamber 38 which is separate from the fluidway in which the plug is disposed.

Mounted on cover 4 is a yoke 48 and in yoke 48 is rigidly secured a split bearing 52. A lifter nut 54 is rotatably mounted in the split bearing 52 so that the lifter nut 56 is confined to rotation only. Lifter nut 54 has right-hand threads machined on its inner surface which co-act with similar threads machined on stem 46. A lifter lever 70 is centrally located on a part 56 of lifter nut 54 and is rigidly keyed thereto by means of pin 76 and also held from any axial motion by a lock nut 73. When lifter nut 56 is given a clockwise rotation and stem 46 is held from rotation, plug 22, through stem 46, will be elevated and unwedged and when lifter nut 56 is given a counterclockwise rotation and the stem 46 is held from rotation, plug 22 will be lowered and rewedged.

Referring now to Fig. 3, there is mounted in the chamber 38 of cover 4 two guide rods 60. These guide rods may be circular in shape and form a guideway along which a crosshead 64 slides only with a straight line motion. This crosshead 64 has associated therewith a trunnion 74 on its bottom and a trunnion 88 on its top. The trunnion 74 is connected to the lifter lever 70 by means of a link 72. Trunnion 88 includes a roller which acts on and co-operates with rotator lever 80.

Rotator lever 80 has two arms 82 and 84 between which is a slot 86. Arm 82 has a flat surface 83 which is arranged to be parallel with the guides when the lever 80 and plug are in the closed position. Arm 84 has a flat surface 85 which is arranged to be parallel with the guides when the lever 80 and plug are in the open position. On arm 82 there are adjustable stop screws and lock nuts 92 and 94, adapted to abut stops 96 and 98.

In Fig. 3, the operating mechanism is shown in plug-closed position. The crosshead is at the extreme left. By moving the crosshead therefrom to the right, the movement being accomplished by a rod 66, roller 88 moves parallel to surface 83 of arm 82 of lever 80 therefore said lever is held against rotation and in the position shown, because it is confined between the roller 88 of crosshead and stop 96. During this movement of the crosshead, trunnion 74, through link 72, rotates lifter lever 70 clockwise and as stem 46 is held against rotation, lifter nut 54 elevates and unwedges plug 22. The further movement of the crosshead to the right now permits roller 88 to engage arm 84 of lever 80 and then by entering slot 86 of rotator lever 80 the said lever is caused to rotate from the position shown in Figs. 3 and 4 to the position in Figs. 5 and 6 thereby rotating plug 22.

During the rotation of lever 80, lifter lever 70 is also rotated and when the lever 80 has been rotated through an angle of 90 degrees, the stop screw 94 abuts stop 98. During the latter part of the rotation of lever 80 and as roller 88 emerges from slot 86 thereof the link 72 is going through a dead center position wherefor there is very little rotation of lifter lever 70. When roller 88 emerges from slot 86 it passes along surface 85 of arm 84 of lever 80, and the final movement of the crosshead to the right moves roller 88 along the said surface 85, maintaining the rotator lever 80 against rotation as it is locked between surface 85 and stop 98.

As roller 88 moves along surface 85 from the position shown in Fig. 5 to that shown in Fig. 6, and as link 72 has gone through its dead center position, this movement of the crosshead reverses the rotation of the lifter lever 70 to now rotate it counterclockwise. As rotator lever 80 is held rigidly with respect to rotation, the final movement of the crosshead and counterclockwise rotation of lever 70 rewedges the plug 22. The reverse of all this action takes place with the movement of the crosshead from right to left, or to close the valve.

Reciprocation of the crosshead 64 is shown as being accomplished by means of piston rod 66 but can be accomplished by other means such as a threaded member which would co-operate with threads in the crosshead.

A hydraulic cylinder 100 is shown in Fig. 2 but any means, such as manual operation or motor operation can accomplish the same result without in any way changing the novel characteristics of the structure. A piston 104 is reciprocable in the cylinder to which the rod 66 is secured. Ports 108 are provided to facilitate fluid being admitted to and discharged from the cylinder. The cylinder may be screwed to the valve structure by a member 102 and the rod 66 is slidable through a stuffing box represented generally by 110.

The stop screws 92 and 94 of rotator lever are adjustable permitting easy alignment of the plug in either its open or closed position; the former is used for the closed position while the latter is for the open position. It is very essential that the plug 22 be not wedged with too much force and as shown in Fig. 2, the travel of the piston 104 may be confined between stops 112 and 114 in its closed and open position. By means of nuts 120 on rod 66 the position of the crosshead 64 in both its open and closed positions can be definitely and easily adjusted as the movement of the crosshead at this point does not affect rotator lever 80 but does affect lifter lever 70.

According to the preferred form of the invention, a part 47 extends upwardly from stem 46 and projects through a cover member 40. A pointer member 49 is affixed to the outer end of the part 47 and this member co-operates with a suitable scale (not shown) on the cover 40 to indicate the position of the plug.

The modified form of operating mechanism shown in Figs. 7 to 12 will now be described.

A plug-stem threaded, as shown, is represented at 130 which is similar to that already described. A split bushing or bearing 132 is carried by a casing or part 134 and a nut 136 threadedly engaging the stem is rotatable in the bearing. An upper part 138 of the nut, more or less flange-like, and a lower part 140 of the nut are disposed at opposite ends of the bushing to hold it against axial movement.

A rotator lever 142 is fixed to the stem 130 and as the stem is elevated and lowered to move the plug up and down the said lever moves up and down with it. A lifter lever 144 is disposed on part 138 of the nut 16 and may be secured against rotation relative thereto by a pin 146. A nut 148 serves to hold the lever 144 on the part 138.

As in the former case when the lever 144 is rotated in one direction or the other to rotate nut 136 the stem is raised and lowered by means of said nut 136 to move the plug associated with the stem between its wedged and non-wedged positions. As rotator lever 142 is rotated in one direction or the other the stem is rotated thereby to rotate the plug between its open and closed positions.

A fork-like member 150 having upper and lower arms 152 and 154 is pivoted at 156 to the casing. A roll 158 is pivoted at 159 to the arms of the fork 150 at their outer ends which is disposed in a slot 160 of rotor lever 142. The said slot has a wider outer portion 162, as shown. A link 164 is pivoted at 159 to the fork and at 166 to lifter lever 144, whereby lifter lever is actuated by swinging movements of the fork.

A rod 168 is arranged for reciprocation similarly to rod 66 already described and a member 170 on its end is connected by links 172 to the arms of fork 150 whereby the fork is actuated by reciprocation of rod 168. The said rod may be reciprocated by a piston, manual or electrical operation, as may be desired.

The rotor arm 142 is in its extreme left position in Fig. 7 wherein the stem 130 is positioned so that the plug is in its closed position.

An adjustable stop screw 174 carried by the rotor arm 142 is arranged to abut a stop 176 when the lever 142 is in plug closed position. A similar screw 178 is arranged to abut a stop 180 when the arm 142 is in plug open position. By means of the screws the limit of movement of the lever 142 may be made to position the plug accurately in its open or closed position.

As the rod 168 moves to the right from the position shown in Fig. 7 to the position shown in Fig. 9 the fork 150 is swung counterclockwise swinging lifter lever 144 clockwise, rotating nut 138 and elevating the stem 130 and plug to move it from wedged position. During this movement of the fork the rotor lever 142 is held against stop 176 and prevented from rotation by roller 158 of fork 150 which traverses a side 161 of the slot of said lever.

The continual counterclockwise rotation of the fork 150 from the position shown in Fig. 9 causes the roll 158 to enter the narrow part of the slot 160 of rotator lever 142 whereupon said rotor lever 142 is rotated clockwise, from the position shown in Fig. 9 to that in Fig. 11 to thereby rotate stem and the plug from its closed to open position. During the latter part of the rotation of lever 142 the link 164 is in a more or less dead center position which results in but little rotation of the lifter lever 144.

When the rotator lever 142 is in plug open position, that shown in Fig. 11, the stop screw 178 abuts stop 180 and as fork 142 completes its movement counterclockwise, from the position of Fig. 11 to that of Fig. 12, the roller 158 of the fork now traverses side 163 of the slot of lever 142. The roll 158 and stop screw 178 hold the lever 142 against movement while the lifter lever 144 is now rotated counterclockwise to rotate nut 136 and bring about lowering of the stem and rewedging of the plug in its open position.

As rod 168 is moved to the left to swing fork 150 clockwise the lifter lever 144 is rotated to move the plug from its wedged position, during which time the rotor lever is being held against rotation. When the plug has been elevated to unwedged position the rotor lever is rotated to rotate the stem and plug to closed position and then finally the stem is lowered to move the plug to its wedged position.

While we have described the invention in great detail with respect to a preferred form thereof, it is not desired to be limited thereto since many changes and modifications may be made therein without departing from the spirit and scope of the invention. What it is desired to claim and secure by Letters Patent of the United States is:

1. The combination of a plug reciprocable and rotatable in a body and having a stem with operating means therefor comprising, an operating member guided for reciprocating movements between plug closed and open positions, a rotatable lifter lever threadedly associated with said stem, connections between the lever and operating member whereby the lever is rotated by the said member, a second lever fixed to said stem having diverging arms, means on said operating member to engage said arms whereby the second lever is swung thereby, all adapted and arranged whereby as the operating member is moved from a plug closed to open position the lifter lever is first rotated to unseat said plug and then the said second lever is actuated to rotate the plug to open position and finally the lifter lever is rotated reversely to seated position.

2. A plug valve comprising a valve casing, a tapered plug seated therein, a lever connected to the plug for turning it to and from open and closed positions, actuating means for moving the lever and including a pin reciprocable in a substantially straight line, the lever being provided with a three-leg slot for receiving the pin, a leg of the slot lying in the path of movement of the pin at each end of said path whereby idle play is afforded between the pin and lever for the extreme portions of the movement of the actuating means, the remaining leg of the slot being disposed at an angle to said path of movement to permit the lever to be moved by the pin, and means operative by said actuating means during said idle play for moving the plug axially from its seat preliminary to its being turned.

3. A plug valve apparatus comprising in combination, a casing having a tapered plug bore, a plug in said bore arranged for reciprocation between seated and non-seated positions and for rotation between open and closed positions relative to said bore, a rotating lever for rotating said plug, a reciprocating lever and connections for reciprocating said plug, operating means for rotating and reciprocating said plug including a part movable between valve open and valve closed positions, connections between said movable part and said reciprocating lever, the said rotating lever being provided with separate surfaces engageable by the movable part, the said connections and separate surfaces being relatively arranged so that as the movable part moves from valve closed position to valve open position the reciprocating lever is first operated to move the plug to non-seated positions, and then the rotating lever is rotated to rotate the plug to open position and finally the reciprocating lever is operated to seat said plug with the rotating lever held against substantial movement while the reciprocating lever is operated whereby the plug is rotated only when removed from seated position.

4. A plug valve apparatus comprising in combination, a casing having a tapered plug bore, a plug in said bore arranged for reciprocation between seated and non-seated positions and for rotation between open and closed positions relative to said bore, a rotating lever for rotating said plug, a reciprocating lever and connections for reciprocating said plug, operating means for rotating and reciprocating said plug including a part movable between valve open and valve closed positions, connections between said movable part and said reciprocating lever, the said rotating lever being provided with separate surfaces engageable by the movable part, the said connections and separate surfaces being relatively arranged so that as the movable part moves from valve closed position to valve open position the reciprocating lever is first operated to move the plug to non-seated positions, and then the rotating lever is rotated to rotate the plug to open position and finally the reciprocating lever is operated to seat said plug with the rotating lever held against substantial movement while the reciprocating lever is operated whereby the plug is rotated only when removed from seated position, the said connections including a link pivotally connected to said reciprocating lever and movable part.

5. A plug valve apparatus comprising in combination, a casing having a tapered plug bore, a plug in said bore arranged for reciprocation between seated and non-seated positions and for rotation between open and closed positions relative to said bore, a rotating lever for rotating said plug, a reciprocating lever and connections for reciprocating said plug, operating means for rotating and reciprocating said plug including a part movable between valve open and valve closed positions, connections between said movable part and said reciprocating lever, the said rotating lever being provided with separate surfaces engageable by the movable part, the said connections and separate surfaces being relatively arranged so that as the movable part moves from valve closed position to valve open position the reciprocating lever is first operated to move the plug to non-seated position, and then the rotating lever is rotated to rotate the plug to open position and finally the reciprocating lever is operated to seat said plug with the rotating lever held against substantial movement while the reciprocating lever is operated whereby the plug is rotated only when removed from seated position, the said separate surfaces being formed by parts of the rotating lever spaced from one another.

6. A plug valve apparatus comprising in combination, a casing having a tapered plug bore, a plug in said bore arranged for reciprocation between seated and non-seated positions and for rotation between open and closed positions relative to said bore, a rotating lever for rotating said plug, a reciprocating lever and connections for reciprocating said plug, operating means for rotating and reciprocating said plug including an actuating part movable between valve open and valve closed positions, connections between said movable part and said reciprocating lever, the said rotating lever having one part in the path of movement of the actuating part at each end of its path whereby idle play is afforded between said part and lever for the extreme portions of the movement of the actuating part and another part spaced from said one part to permit the lever to be moved by said actuating part, the said connections being arranged whereby the plug is reciprocated from its seat during said idle play preliminary to its being rotated.

7. A valve apparatus comprising in combination, a casing having a tapered plug bore, ports and upper and lower bearings, a ported tapered plug in said bore having pivots in said bearings adapted for reciprocating and rotating movements whereby the plug may in closed position move axially to unseated position, rotate to open position with the port thereof aligned with the casing ports, move axially to seated position and move axially and rotate in reverse direction to closed position, operating mechanism including, a power member reciprocable in a straight line, a member guided in a definite path actuated thereby, a plug rotating member non-rotatable relative to said plug actuated by and cooperating with said guided member and rotatable on a fixed axis, engageable stop means to limit rotation thereof, means cooperating with said plug for positively reciprocating the same in opposite directions, operative connections between said guided member and reciprocating means, said plug rotating member and guided member being arranged whereby during the intermediate portion of the movement of the latter the former is rotated and dwells during the initial and final movements thereof with the stop means in engagement, and the said reciprocating means and connections being arranged whereby the plug is reciprocated while the rotating member dwells.

8. A valve apparatus comprising in combination, a casing provided with a tapered plug bore having its larger end uppermost and ports and upper and lower bearings, a ported tapered plug in said bore having pivots in said bearings adapted for reciprocating and rotating movements whereby the plug may when in closed position move axially to unseated position, rotate to open position with the port thereof aligned with the casing ports, move axially to seated position and move axially and rotate in reverse direction to closed position, operating mechanism at the uppermost end of the plug including, a power member reciprocable in a straight line, a member guided in a definite path actuated thereby, a plug rotating member non-rotatable relative to said plug actuated by and cooperating with said guided member and rotatable on a fixed axis when rotating said plug, engageable stop means to limit rotation thereof, means cooperating with the said plug for positively reciprocating the same in opposite directions, operative connections between said guided member and reciprocating means, said plug rotating member and guided member being arranged whereby during the intermediate portion of the movement of the latter the former is rotated and dwells during the initial and final movements thereof with the stop means in engagement, and the said reciprocating means and connections being arranged whereby the plug is reciprocated while the rotating member dwells.

DAVID D. GOLDBERG.
AARON R. KLIGMAN.